US007768339B2

(12) United States Patent
Suzuki

(10) Patent No.: US 7,768,339 B2
(45) Date of Patent: Aug. 3, 2010

(54) VOLTAGE REGULATOR

(75) Inventor: Teruo Suzuki, Chiba (JP)

(73) Assignee: Seiko Instruments Inc. (JP)

( * ) Notice: Subject to any disclaimer, the term of this patent is extended or adjusted under 35 U.S.C. 154(b) by 3 days.

(21) Appl. No.: 12/321,316

(22) Filed: Jan. 16, 2009

(65) Prior Publication Data

US 2009/0184748 A1 Jul. 23, 2009

(30) Foreign Application Priority Data

Jan. 18, 2008 (JP) ............................ 2008-008666

(51) Int. Cl.
*H02H 9/00* (2006.01)

(52) U.S. Cl. ....................... 327/513; 327/538; 327/543; 323/275; 323/277; 323/279; 323/312; 323/316; 323/907; 323/908; 361/18; 361/93.9; 361/103

(58) Field of Classification Search ................. 327/512, 327/513, 538–543; 323/274–277, 279, 311–317, 323/907, 908; 361/18, 93.8, 93.9, 103
See application file for complete search history.

(56) References Cited

U.S. PATENT DOCUMENTS

| | | | | |
|---|---|---|---|---|
| 6,205,010 | B1 * | 3/2001 | Ohsaka et al. | 361/103 |
| 6,870,351 | B2 * | 3/2005 | Sugimura | 323/277 |
| 6,927,960 | B2 * | 8/2005 | Huang et al. | 361/93.8 |
| 7,129,759 | B2 * | 10/2006 | Fukami | 327/110 |
| 7,511,464 | B2 * | 3/2009 | Suzuki | 323/275 |
| 7,629,783 | B2 * | 12/2009 | Chang | 323/276 |

FOREIGN PATENT DOCUMENTS

JP 2003271251 A * 9/2003

OTHER PUBLICATIONS

Patent Abstracts of Japan, publication No. 2003-271251, publication date Sep. 26, 2003.

* cited by examiner

*Primary Examiner*—Lincoln Donovan
*Assistant Examiner*—Patrick O'Neill
(74) *Attorney, Agent, or Firm*—Adams & Wilks

(57) ABSTRACT

Provided is a voltage regulator for limiting a rush current from an output stage transistor. The voltage regulator includes an output current limiting circuit having a low detection current value and an output current limiting circuit having a high detection current value, and is structured so as to enable operation of the output current limiting circuit having a low detection current value during a time period from a state in which an overheat protection circuit detects overheat and an output current is stopped to a state in which an overheat protection is canceled and a predetermined time passes. Accordingly, after the overheat protection is cancelled, an excessive rush current can be limited.

2 Claims, 3 Drawing Sheets

VOLTAGE REGULATOR

BACKGROUND OF THE INVENTION

1. Field of the Invention

The present invention relates to a voltage regulator for generating a constant voltage based on an input voltage.

2. Description of the Related Art

In order to stabilize an output voltage, an output terminal of a voltage regulator generally includes an external capacitor. Before activation of the voltage regulator, the external capacitor does not store charges. During a time period from immediately after the activation to a moment at which the output voltage generates a constant voltage, a charging current flows into the external capacitor. The charging current generated at that time is in a state in which an equivalent impedance of the external capacitor is low, and hence an excessive rush current flows. In the worst case, the rush current may be a cause of breakage such as blowout of a wire bonding. Accordingly, the voltage regulator includes a circuit for limiting an output stage transistor with respect to the generation of the rush current.

Hereinafter, a conventional voltage regulator is described. FIG. 3 is a circuit diagram illustrating the conventional voltage regulator.

The voltage regulator includes an amplifier circuit 25, an output stage transistor T23 and a testing transistor T24, a switch circuit 30, a current limiting circuit 20, an on/off circuit 26, and a counter circuit 27. The amplifier circuit 25 compares a divided voltage obtained by dividing an output voltage of the voltage regulator by resistors R31 and R32 and fed back with a reference voltage generated by a reference voltage circuit to thereby control the output voltage of the voltage regulator. The output stage transistor T23 and the testing transistor T24 output drain currents corresponding to a voltage (gate voltage) output by the amplifier circuit 25. The switch circuit 30 selects an output destination of the drain current of the transistor T24. The current limiting circuit 20 controls gate voltages of the transistor T23 and the transistor T24 so that the drain currents have the detection current value or smaller in a case where the drain current of the transistor T24 has a predetermined detection current value or larger. The on/off circuit 26 controls on/off of the voltage regulator, and the counter circuit 27 counts an elapsed time from a moment at which the voltage regulator is turned on by the on/off circuit 26.

The current limiting circuit 20 includes an output current limiting circuit 21 for actually controlling an excessive drain current, and an output current limiting circuit 22 for controlling, by using a detection current value smaller than a detection current value of the output current limiting circuit 21, the excessive drain current. In the output current limiting circuit 21 and the output current limiting circuit 22, the counter circuit 27 controls the switch circuit 30 according to an obtained elapsed time. The switch circuit 30 connects the output current limiting circuit 22 to the transistor T24 until a predetermined elapsed time passes, and connects the output current limiting circuit 21 thereto after the predetermined elapsed time passes.

According to the above-mentioned voltage regulator, the on/off circuit 26 controls the voltage regulator to be turned on, the amplifier circuit 25 starts to operate, and the counter circuit 27 starts to count an elapsed time. Subsequently, the external capacitor connected to an output voltage terminal starts to be charged quickly, and hence the transistor T23 allows an excessive drain current (rush current) to flow. Based on the rush current, the transistor T24 allows a predetermined amount of the drain current to flow into the current limiting circuit 20. In this case, the switch circuit 30 is in a state of selecting the output current limiting circuit 22 which is likely to control the drain current. The output current limiting circuit 22 controls the gate voltages of the transistors T23 and T24 so that the drain current has the detection current value or smaller in a case where the drain current has a predetermined detection current value or larger, and controls an excessive drain current to be small. After the voltage regulator is tuned on and a predetermined elapsed time passes, the switch circuit 30 selects the output current limiting circuit 21 which is unlikely to control the drain current (for example, see 2003-271251 A).

However, in a voltage regulator including an overheat protection circuit, not only in a case where the voltage regulator is turned on and an excessive rush current is generated, but also in a case where the overheated state is detected and the output transistor is controlled to stop an output current and thereafter the temperature decreases and the output current starts to flow again, there is generated an excessive rush current that charges the external capacitor connected to the output terminal of the voltage regulator.

SUMMARY OF THE INVENTION

The present invention has been made in view of the above-mentioned circumstances, and provides a voltage regulator in which an overheat protection circuit detects an overheated state and stops an output transistor operation, and a rush current from an output transistor is limited when the output transistor operates after a temperature decreases.

A voltage regulator according to the present invention includes: a first output current limiting circuit having a first detection current value; a second output current limiting circuit having a second detection current value larger than the first detection current value; an overheat protection circuit for detecting a temperature and outputting a detection signal indicating one of an overheated state and a normal state; and a detection circuit for receiving an input of the detection signal of the overheat protection circuit and an input of a rising signal of an input voltage, in which the detection circuit enables operation of the first output current limiting circuit when the detection signal indicating the overheated state is input and during a time period from when the detection signal indicating the normal state is input to when a predetermined period of time passes.

In the present invention, there is provided the structure in which the output current limiting circuit having a low detection current value and the output current limiting circuit having a high detection current value, and operation of the output current limiting circuit having a low detection current value is enabled during a time period from a state in which the overheat protection circuit detects overheat and an output current is stopped to a state in which an overheat protection is canceled and a predetermined time passes. Accordingly, after the overheat protection is cancelled, an excessive rush current can be limited.

DETAILED DESCRIPTION OF THE PREFERRED EMBODIMENT

Hereinafter, with reference to the drawings, an embodiment of the present invention is described.

Figure 1:
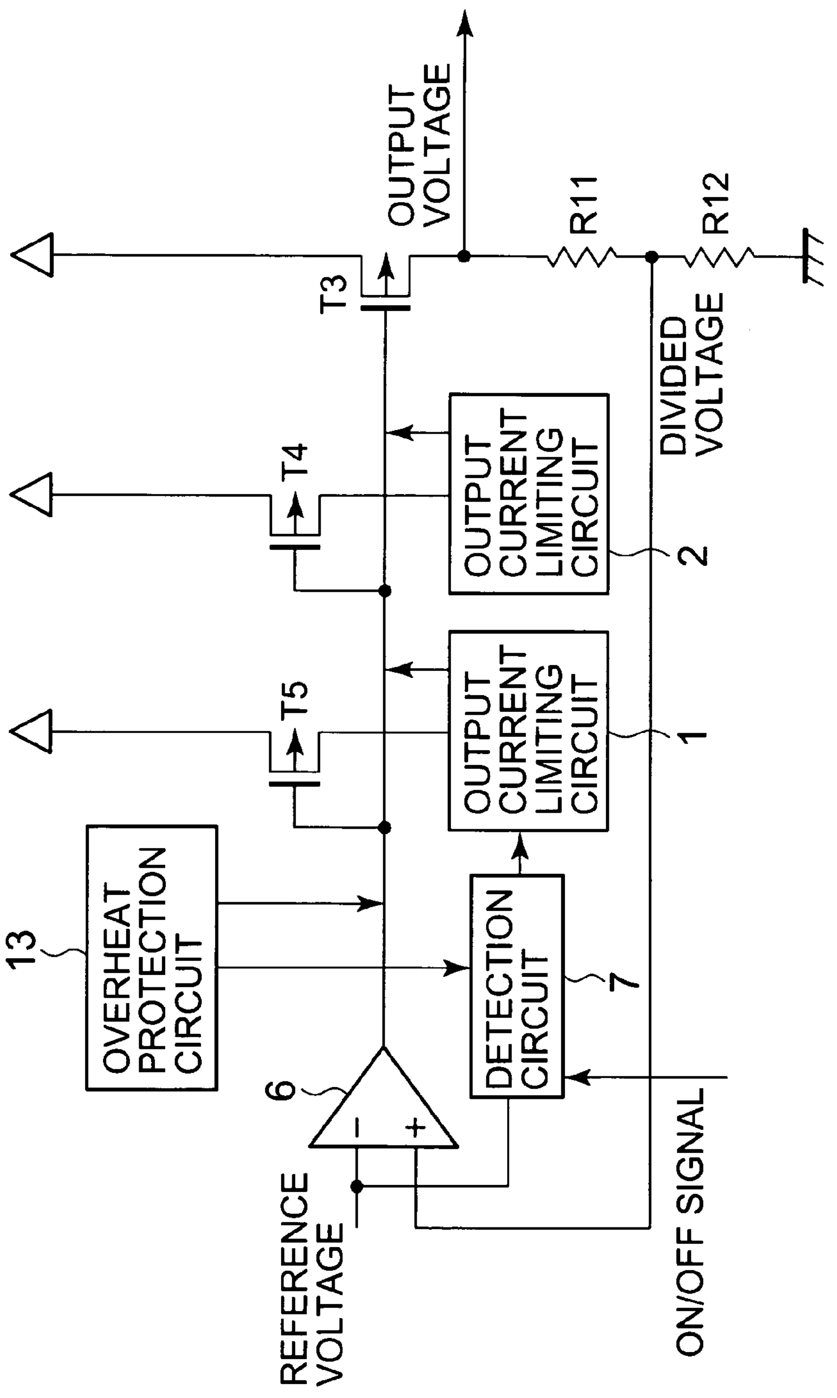
FIG. 1 is a circuit diagram illustrating a voltage regulator according to the present invention.

First, a voltage regulator is described. FIG. 1 is a circuit diagram illustrating the voltage regulator according to the present invention.

The voltage regulator of FIG. 1 includes voltage dividing resistors R11 and R12, an error amplifier circuit 6, an output transistor T3, testing transistors T4 and T5, an output current limiting circuit 1, an output current limiting circuit 2, an overheat protection circuit 13, and a detection circuit 7.

The voltage dividing resistors R11 and R12 divide an output voltage of the voltage regulator to output a divided voltage. The error amplifier circuit 6 compares the divided voltage with a reference voltage output by a reference voltage circuit, and outputs a voltage according to the comparison result to the output transistor T3. The testing transistors T4 and T5 each have a gate connected to a gate of the output transistor T3. Accordingly, the testing transistors T4 and T5 can detect a current flowing into the output transistor T3. The output current limiting circuit 1 controls a gate voltage of the output transistor T3 based on a current of the testing transistor T5. The output current limiting circuit 2 controls the gate voltage of the output transistor T3 based on a current of the testing transistor T4. A detection current value of the output current limiting circuit 2 is larger than that of the output current limiting circuit 1. The overheat protection circuit 13 detects an overheated state of the voltage regulator and controls the current flowing into the output transistor T3. The detection circuit 7 detects that the voltage regulator is turned on with use of an on/off signal of an input voltage, and detects overheat of the voltage regulator with use of a signal of the overheat protection circuit 13, thereby outputting a signal to the output current limiting circuit 1.

The voltage regulator having the above-mentioned structure prevents a rush current through the following operation.

In a case where an input voltage of the voltage regulator at a time of activation thereof rises, the reference voltage is input to the error amplifier circuit 6, but an output voltage of the voltage regulator is not output. Accordingly, the dividing voltage input to the error amplifier circuit 6 becomes lower than the reference voltage. Therefore, the gate voltage input to the output transistor T3, which is output from the amplifier circuit 6 decreases, and hence a drain current of the output transistor T3 becomes excessively large. Owing to the excessive drain current (rush current), the external capacitor connected to the output voltage terminal starts to be charged quickly. Based on the rush current, the testing transistors T4 and T5 allow a predetermined amount of the drain current to flow into the output current limiting circuit 2 and the output current limiting circuit 1, respectively.

The output current limiting circuit 1 controls, in a case where a drain current of the testing transistor T5 has a value larger than a predetermined detection current value, gate voltages of the output transistor T3 and the testing transistors T4 and T5 so that the drain current becomes smaller than the detection current value, and controls so that respective drain currents thereof decrease. Note that, on this occasion, both the output current limiting circuit 1 and the output current limiting circuit 2 operate. The output current limiting circuit 1 uses a detection current value smaller than that of the output current limiting circuit 2, and hence the output current limiting circuit 1 controls the rush current of the output transistor T3 to be small. Further, the detection circuit 7 detects the on/off signal therein, the reference voltage, and an overheated state of the voltage regulator. In a state in which the voltage regulator is not in the overheated state and the on/off signal is in an on-state, and after a predetermined period of time has passed since the reference voltage reaches a predetermined voltage, the detection circuit 7 stops an operation of the output current limiting circuit 1 and controls so that only the output current limiting circuit 2 operates.

Further, in a case where the input voltage of the voltage regulator has already risen, when the overheat protection circuit 13 detects a predetermined temperature because a temperature of the voltage regulator rises due to internal heat generation in addition to an ambient temperature, the overheat protection circuit 13 increases the gate voltage of the output transistor T3 up to a source voltage to thereby stop the output current. In this case, the overheat protection circuit 13 and the detection circuit 7 detect an overheated state of the voltage regulator and control so that the output current limiting circuit 1 operates. After that, the internal heat generation disappears because the output current is stopped, and in a case where the ambient temperature decreases to a temperature lower than a reset temperature, the gate voltage of the output transistor T3, which is controlled by the overheat protection circuit 13, decreases, whereby an external capacitor connected to the output voltage terminal starts to be charged quickly. Based on this rush current, in a case where the drain current of the testing transistor T5 has a value larger than a predetermined detection current value, the output current limiting circuit 1 controls the gate voltages of the output transistor T3 and the testing transistors T4 and T5 so that the drain current has a value smaller than the detection current value, and controls so that the respective drain current thereof decrease. Note that, on this occasion, both the output current limiting circuit 1 and the output current limiting circuit 2 operate. The output current limiting circuit 1 uses a detection current value smaller than that of the output current limiting circuit 2, and hence the output current limiting circuit 1 controls the rush current of the output transistor T3 to be small. After the temperature of the voltage regulator decreases to the reset temperature or lower and then a predetermined period of time has passed since the output current starts to flow, the detection circuit 7 stops the operation of the output current limiting circuit 1, and only the output current limiting circuit 2 operates.

Figure 2:
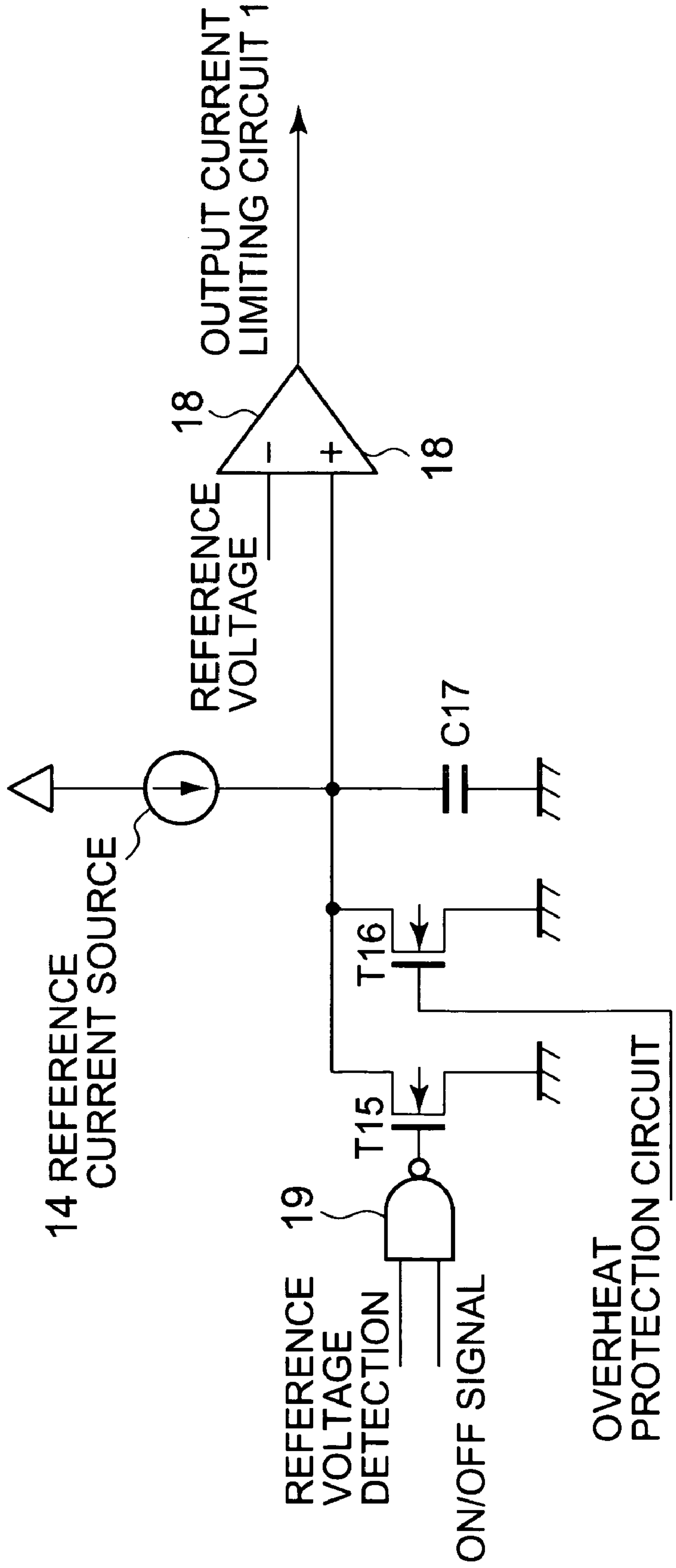
FIG. 2 is a circuit diagram illustrating an example of a detection circuit of the voltage regulator according to the present invention.
Figure 3:
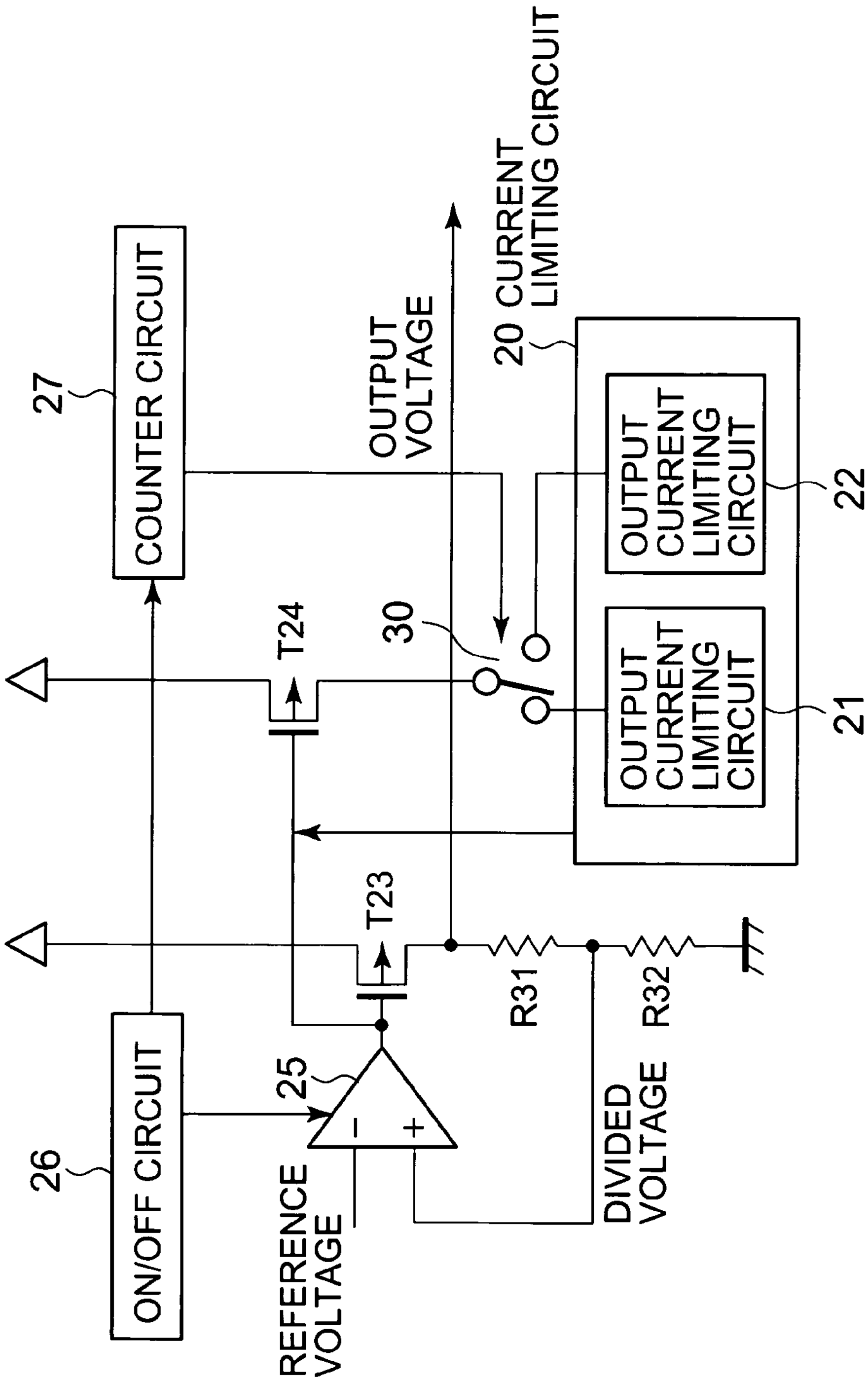
FIG. 3 PRIOR ART
FIG. 3 is a circuit diagram illustrating a conventional voltage regulator.

Next, the detection circuit 7 is described. FIG. 2 is a circuit diagram illustrating an example of the detection circuit 7 of the voltage regulator according to the present invention.

The detection circuit 7 is connected to a capacitor C17 having one terminal grounded and another terminal connected to a reference current source 14. Further, the detection circuit 7 is connected to a drain of an enhancement NMOS transistor 15, a drain of an enhancement NMOS transistor 16, and an input of a comparator 18. The comparator 18 controls start and stop of the operation of the output current limiting circuit 1.

To a gate of the enhancement NMOS transistor 15, a control circuit 19 is connected. The control circuit 19 outputs a low signal when becoming an on-state in a state in which the voltage regulator is not in the overheated state, the on/off signal, which is an internal signal, becomes the on-state, and a reference voltage of the inside is detected and reaches a desired voltage. Further, to a gate of the enhancement NMOS transistor 16, an output signal of an overheat protection circuit is connected. The overheat protection circuit outputs a high signal in an overheat detecting state and outputs a low signal in other states. In a case where one of the gates of the enhancement NMOS transistor 15 and the enhancement NMOS transistor 16 is in a high state, discharge of charges accumulated in the capacitor C17 is controlled and an input signal of the comparator 18 is reduced. The comparator 18 compares a potential stored in the capacitor C17 with a reference voltage of the inside. In a case where the reference voltage has a potential higher than a potential stored in the capacitor C17, the output current limiting circuit 1 is in an operating state.

In contrast to this, in a case where both the gates of the enhancement NMOS transistor 15 and the enhancement NMOS transistor 16 are in a low state, the reference current source 14 starts to charge the capacitor C17 at a constant current. After a predetermined period of time has passed, a potential stored in the capacitor C17 becomes higher than a potential of the reference voltage, whereby the output current limiting circuit 1 is in a stopped state.

What is claimed is:

1. A voltage regulator, comprising:

a first output current limiting circuit having a first detection current value;

a second output current limiting circuit having a second detection current value larger than the first detection current value;

an overheat protection circuit for detecting a temperature and outputting a detection signal indicating one of an overheated state and a normal state; and a detection circuit for receiving an input of the detection signal of the overheat protection circuit and an input of a rising signal of an input voltage, wherein the detection circuit enables operation of the first output current limiting circuit when the detection signal indicating the overheated state is input and during a time period from when the detection signal indicating the normal state is input to when a predetermined period of time passes.

2. A voltage regulator according to claim 1, wherein the detection circuit enables operation of the first output current limiting circuit during a time period from when the rising signal of the input voltage is input to when the predetermined period of time passes.

* * * * *